United States Patent [19]

Kutschenreuter, Jr.

[11] Patent Number: 5,301,901
[45] Date of Patent: Apr. 12, 1994

[54] TELESCOPING CENTERBODY WEDGE FOR A SUPERSONIC INLET

[75] Inventor: Paul H. Kutschenreuter, Jr., Loveland, Ohio

[73] Assignee: General Electric Company, Cincinnati, Ohio

[21] Appl. No.: 10,963

[22] Filed: Jan. 29, 1993

[51] Int. Cl.⁵ .............................................. B64D 33/02
[52] U.S. Cl. ................................. 244/53 R; 137/15.1
[58] Field of Search ...................... 244/53 R, 53 B; 137/15.1, 15.2

[56] References Cited

U.S. PATENT DOCUMENTS

| | | |
|---|---|---|
| 2,934,893 | 5/1960 | Streeter . |
| 2,969,939 | 1/1961 | Sulkins et al. ............... 244/53 B |
| 3,199,810 | 8/1965 | Stroud et al. ............... 244/53 B |
| 3,242,671 | 3/1966 | Moorehead ................. 137/15.1 |
| 3,295,555 | 1/1967 | Jamer et al. ............... 244/53 B |
| 3,495,605 | 2/1970 | Gunnarson et al. .......... 137/15.1 |
| 3,589,379 | 6/1971 | Daues et al. . |
| 3,613,704 | 10/1971 | Goldsmith et al. . |
| 3,799,475 | 3/1974 | Mitchell et al. . |
| 3,974,648 | 8/1976 | Kepler . |
| 4,000,869 | 1/1977 | Wong et al. . |
| 4,007,891 | 2/1977 | Sorensen et al. . |
| 4,043,508 | 8/1977 | Speir et al. . |
| 4,307,743 | 12/1981 | Dunn ........................ 137/15.1 |
| 4,418,708 | 12/1983 | Schulze et al. . |
| 4,523,603 | 6/1985 | Peikert . |
| 4,620,679 | 11/1986 | Karanian . |
| 4,930,309 | 6/1990 | Hartman . |
| 5,026,004 | 6/1991 | Dobie et al. . |
| 5,078,341 | 1/1992 | Bichler et al. . |
| 5,082,206 | 1/1992 | Kutschenreuter, Jr. et al. . |
| 5,105,615 | 4/1992 | Herzog . |
| 5,116,001 | 5/1992 | Perry ........................ 244/53 B |
| 5,119,626 | 6/1992 | Lardellier et al. . |

FOREIGN PATENT DOCUMENTS 910467  11/1962  United Kingdom ............ 244/53 B

Primary Examiner—Galen L. Barefoot
Attorney, Agent, or Firm—Jerome C. Squillaro

[57] ABSTRACT

An aircraft engine two-dimensional inlet system of the present invention provides a telescoping two-dimensional centerbody that is referred to as a wedge. The telescoping wedge may be of a fixed wedge angle design or a variable wedge angle design. The present invention contemplates single and multi-wedge angle designs of the fixed or variable intermediate wedge angle types having more than one ramp angle. The telescoping wedge has at least one upper and lower pair of longitudinally adjacent wedge forward and aft walls that overlap to form an aft facing step and are in controlled sliding engagement.

10 Claims, 3 Drawing Sheets

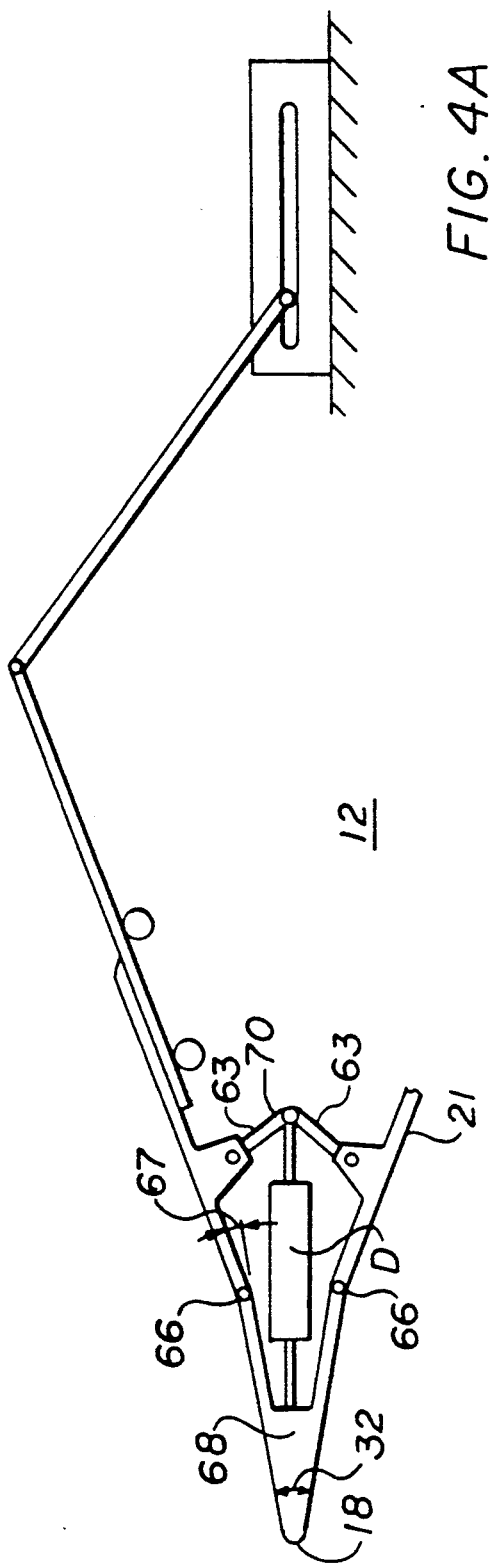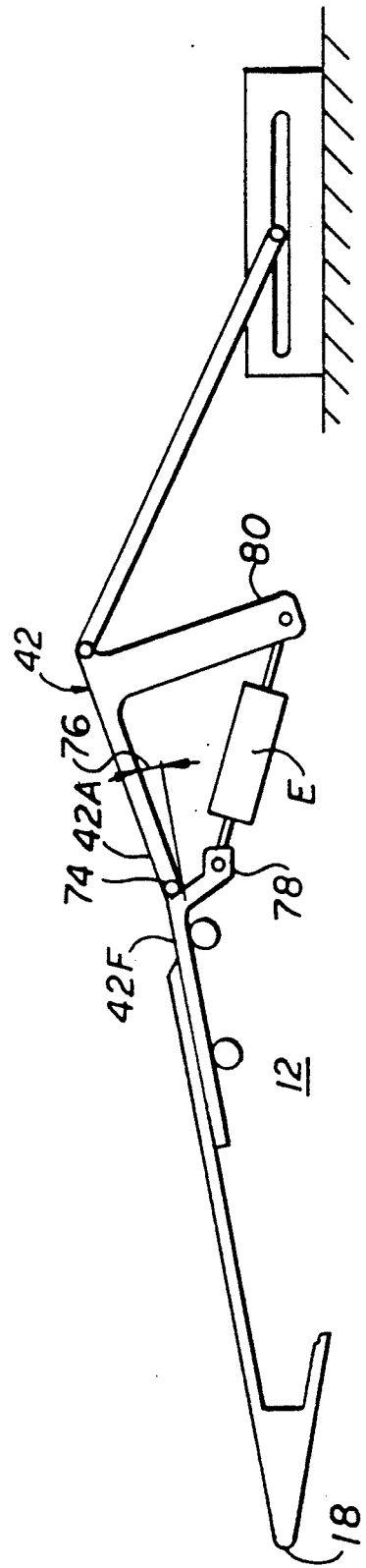

TELESCOPING CENTERBODY WEDGE FOR A SUPERSONIC INLET

BACKGROUND OF THE INVENTION

1. Field of the Invention

This invention relates to supersonic flight vehicles and more particularly to a supersonic engine variable geometry inlet for optimizing engine performance.

2. Description of Related Art

Aircraft engines which are designed to operate at speeds ranging from takeoff, through subsonic and transonic, and into the supersonic regime, require complex air inlet configurations in order to operate efficiently throughout the entire operating range. At lower subsonic speeds, particularly at takeoff, it is desirable to allow the engine maximum access to air, since at these lower speeds there is no substantial "ramming" effect produced, whereby air is literally forced into the engine. Hence, in the low end of its operating range the engine must depend on its ability to draw air in to satisfy its large air demand. The amount of air the engine is able to draw in is a function of the area of the throat, i.e., the point along the length of the inlet at which the main airflow passageway is most constricted. In general, the larger the area of the inlet throat, the greater the amount of air the engine can draw in. At transonic speeds, the airflow demands of the engine may also supersede the efficient supplying ability of the inlet since the inlet throat becomes choked. Thus, it is desirable to be able to enlarge the minimum total cross-sectional area of the inlet passageway in order to satisfy engine transonic airflow demand.

It also is well known in the art that efficient supersonic operation of the engine requires a much smaller throat than at lower flight Mach numbers. Furthermore, it is well known that the inlet must be "started," i.e., that the internal airflow in the main airflow passageway of a diffuser having the inlet be changed from subsonic to supersonic. It is known to start the inlet by translating the inlet centerbody and the throat to provide maximum airflow through the inlet as the aircraft speed increases to supersonic speeds. The design of mixed-compression supersonic inlet systems for long-range supersonic cruise aircraft has centered mainly about the design Mach number requirements. Off-design requirements have generally taken secondary roles in the establishment of final designs. As a result, the off-design engine demand airflow matching and performance requirements have been satisfied by complex variable geometry systems, which, in some cases, may not assure efficient inlet to engine matching compatibility.

It is well known in the prior art to provide supersonic and hypersonic aircraft with variable geometry inlets for the efficient matching of engine airflow requirements over a wide range of flight Mach numbers. At the higher supersonic flight Mach numbers where a combination of external and internal compression is required in order to extract high performance from the captured airflow, the inlet throat area must also be varied. Typically this is accomplished by axially translating one compression surface, typically on an inlet centerbody wedge for two-dimensional inlets and on a conical centerbody for an axisymmetric inlet, relative to the another compression surface either fixed or variable. When this is done typically both the captured inlet airflow and the inlet throat area are simultaneously varied, i.e. independent control of airflow and throat area is not achieved. Such an inlet is described in U.S. Pat. No. 4,007,891 entitled "Jet Engine Intake System".

Also typically employed is the modulation of the supersonic compression turn angles to vary the strength of the oblique shockwave while also varying the inlet throat area. These standard approaches can produce inlets providing high performance levels at a selected design flight Mach number. Their performance at other flight Mach numbers ("off-design"), however, is typically less than it could have been had the inlet been designed for that particular flight Mach number. The reason for this is that although utilizing significant geometry variation, these illustrated standard approaches do not provide enough degrees of variable geometry freedom to closely approximate the optimum inlet flowpath at each flight Mach number. Typically, conventional inlets are unable to de-couple airflow capturing capability from throat area variation capability.

Conventional two-dimensional inlets with or without variable geometry capability operating at high supersonic speeds will produce a complex shockwave flow field having a shock from the leading edge of the centerbody or wedge intersecting a shock from the leading edge of the cowl within the inlet. At the intersection of the two shocks, unless they are balanced, a slip plane will form extending downstream from the shock intersection causing an expansion wave or shock to fall on the compression ramps of the wedge centerbody. This reduces the compression ramp's effectiveness for performing the high pressure recovery function for which the supersonic diffuser inlet is designed and can be a significant source of flow profile distortion for the engine.

What is desired therefore, is an inlet geometry which produces a balanced shockwave system at all supersonic flight Mach numbers and for which the last cowl shockwave always impinges at the throat of the inlet. An important advantage of the impinging cowl shockwave always intersecting the center wedge throat, is simplification and possibly increased efficiency of the center wedge boundary layer bleed system.

It is well known to use center wedge boundary layer bleed systems on the wetted surfaces of the compression ramps of the wedge. However, when inlet shocks impinge at different axial positions on the center wedge, the region of surface boundary layer bleed must be enlarged proportionally. Furthermore, this requires, in many cases, several boundary layer receiving plenums on the back side of the compression ramps to accommodate the pressure rises across each of these shocks. They must be compartmentalized and pressure isolated from each other to prevent boundary layer separation on the supersonic compression side of the ramp which results from recirculation zones in the subsonic boundary layer.

There is a great and long felt need among supersonic aircraft and aircraft engine designers for a two-dimensional supersonic inlet that can operate efficiently at both design and off design Mach numbers with a minimum amount of drag and minimum distortion of the flow profile into the engine. The present invention is directed towards a two-dimensional variable geometry inlet effective to operate at supersonic speeds efficiently with a minimum amount of drag and with low values of flow profile distortion into the engine.

SUMMARY OF THE INVENTION

The aforementioned and other disadvantages of the prior art are overcome by the two-dimensional inlet system of the present invention which provides an axially translating telescoping two-dimensional centerbody, hereinafter referred to as a wedge. The telescoping wedge may be of a fixed wedge angle design or a variable wedge angle design. The present invention contemplates single and intermediate multi-wedge angle designs of the fixed or variable wedge angle types having two or more compression ramp angles. The bi-wedge or other multi-wedge designs are analogous to bi-conic and multi-conic centerbodies for axisymmetric inlets.

The telescoping wedge has at least one upper and lower pair of longitudinally adjacent wedge forward and aft walls wherein the forward wall overlaps the aft wall to form an aft facing wedge and are in controlled sliding engagement. The leading edge upper and lower walls may be at a fixed angle with respect to each other or may be rotatable with respect to each other for a variable angle telescoping wedge. Means are provided to extend and retract the leading edge upper and lower forward walls so as to extend the length of the wedge. The forward walls overlap their corresponding adjacent aft walls with which they are mounted in sliding engagement so that the adjacent walls slide over each other and form a downstream facing aft step.

BRIEF DESCRIPTION OF THE DRAWINGS

The foregoing aspects and other features of the invention are explained in the following description, taken in connection with the accompanying drawings where:

FIGS. 4A-4B are schematic cross-sectional views through two different planes of a telescoping center wedge illustrated in FIG. 1 in accordance with a third embodiment of the present invention.

DETAILED DESCRIPTION OF THE INVENTION

Figure 1:
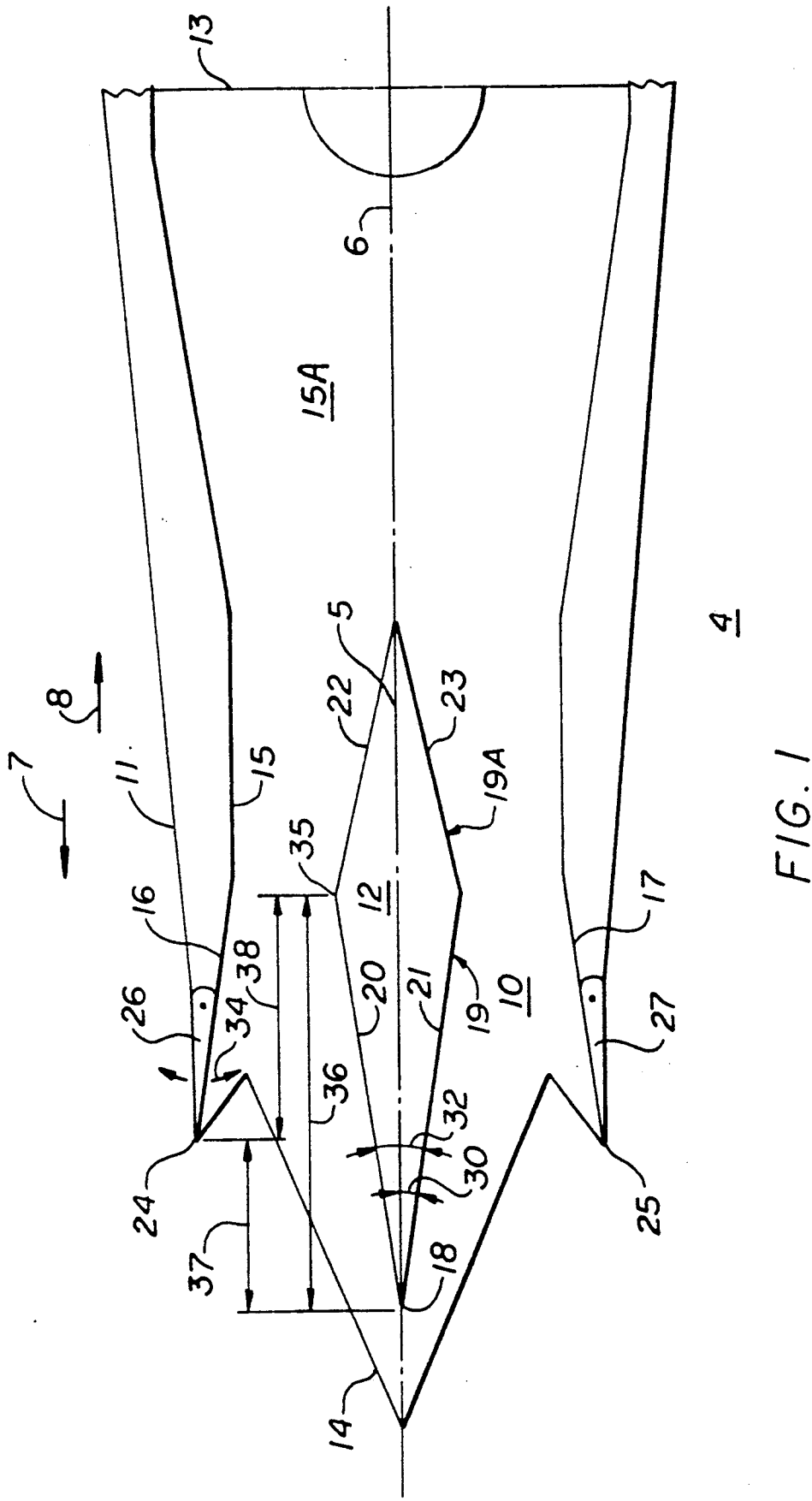
FIG. 1 is a schematic cross-sectional view of an aircraft gas turbine engine cowl having a two-view dimensional inlet with a telescoping center wedge in accordance with one embodiment of the present invention.

Illustrated in FIG. 1 is an aircraft gas turbine engine diffuser 4 having a two-dimensional inlet section 10 upstream, designated by upstream pointing arrow 7 (downstream indicated by downstream pointing arrow 8), of a transition section 15A, for transitioning the flow from a two-dimensional to an axisymmetric flow therebetween. The purpose of the diffuser 4 is to efficiently decelerate the captured freestream airflow to operating conditions required by the aircraft gas turbine engine denoted by an engine inlet plane 13 which typically has a centerline 6 lying in a centerplane 5 of the diffuser 4. The centerplane 5 bisects the inlet section 10 into upper and lower inlet symmetrical sections about the centerplane. Though the present invention is described and illustrated as mirror images of each other, the present invention as claimed covers both non-symmetrical upper and lower embodiments and upper or lower individual embodiments. Furthermore the upper and lower sections of the inlet section 10 of the present invention may be operated in a non-symmetrical manner The inlet section 10 includes a two-dimensional cowling 11 having an axially translating and telescoping wedge 12 disposed within. The cowling 11 has axially downstream extending sidewalls 14, of which only one is shown in this view, between which are laterally disposed a cowl upper ramp 16 spaced apart from a cowl lower ramp 17. The wedge 12, in this particular embodiment, is equidistantly disposed between the spaced apart cowl upper and lower ramps 16 and 17, respectively. The wedge 12, sidewalls 14, and an inner surface 15 of the cowling 11 contain the airflow through the inlet section 10. Wedge 12 has a wedge leading edge 18 on its forebody 19 which includes an upper wedge compression ramp 20 and a lower wedge compression ramp 21 each at a ramp angle 30 with respect to the centerplane 5. Downstream of the forebody 19 is an afterbody 19A having an upper wedge expansion ramp 22 and a lower wedge expansion ramp 23.

The cowling 11 is of the variable type and as such its cowl upper ramp 16 has an upper cowl inlet leading edge 24 on an upper rotatable cowl leading edge ramp 26 and as its cowl lower ramp 17 has a lower cowl inlet leading edge 25 on a lower rotatable cowl leading edge ramp 27. The positions of the upper and lower cowl inlet leading edges 24 and 25, respectively, with respect to the centerplane 5 is varied by rotating the upper and lower cowl inlet leading edges through a cowl inlet ramp angle 34. This together with the position and cross-sectional shape of the telescoping wedge 12 sets the inlet area of the inlet section 10 and the amount of air and pressure rise across the inlet section.

An inlet throat 35, defined as the position in the inlet having the narrowest flowpath area, is typically set from a position along the wedge 12 between the forebody 19 and the afterbody 19A extending across the flowpath to the inner surface 15 of the cowling 11. The throat 35 of the present invention may be varied to change the area at the throat, a first distance 36 from the throat to the wedge leading edge 18 of the wedge 12, respectively, a second distance 37 from the wedge leading edge 18 to the upper and lower cowl inlet leading edges 24 and 25, and a third distance 38 from the throat to the upper and lower cowl inlet leading edges 24 and 25, respectively. When the throat 35 is translated with respect to the cowl leading edge 24, the throat will extend from the same position between the forebody 19 and the afterbody 19A to a different longitudinal position on the inner surface 15. Therefore, since the intersection remains constant it is used to denote the throat 35.

Figure 2:
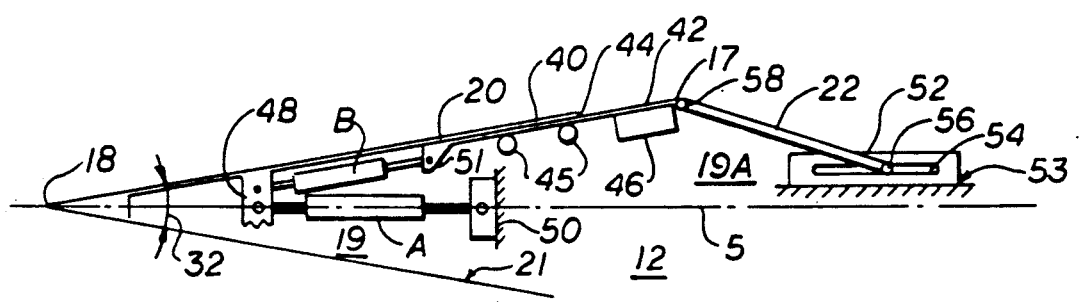
FIG. 2 is a more detailed schematic cross-sectional view of a telescoping center wedge illustrated in FIG. 1 in accordance with one embodiment of the present invention.

The telescoping wedge 12 is illustrated in more detail in FIG. 2 as having a fixed forwardmost wedge angle 32 and being symmetric about centerplane 5. The forebody 19 includes symmetrical upper and lower wedge compression ramps 20 and 21, respectively, and afterbody 19A includes symmetrical upper and lower wedge expansion ramps 22 and 23, respectively (shown in FIG. 1.). It will be apparent that further details are applicable to upper and lower portions of the forebody and afterbody of the wedge. The wedge 12 may be operated asymmetrically, in which case, ramp angles 30 may be different for the upper and lower ramps instead of half the value of the forwardmost wedge angle 32.

A means to telescope the wedge 12 is provided by forming the upper wedge compression ramp 20 from at least one set aftwardly overlapping walls as exemplified by a forward wall 40 which overlaps an aft wall 42 to form an aft facing step 44. The forward wall 40, extending aft from wedge leading edge 18, is the forwardmost wall of the telescoping wedge 12 and the upper compression ramp 20. A roller assembly 45 illustrates a means by which the forward wall 40 and the aft wall 42 are maintained in overlapping sliding engagement during the telescoping of the wedge 12 and the operation of the engine. A leading edge fixed structure 48 is fixedly attached to the upper and lower compression ramps 20 and 21 respectively and in a fixed position relative to the wedge leading edge 18. A first linear actuating means A is disposed between the leading edge fixed structure 48 and a first inlet cowl fixed structure 50 thereby providing a means to longitudinally translate the leading edge 20 and thereby vary and control the first distance 36 in FIG. 1.

Still referring to FIG. 2, a second linear actuating means B is disposed between the leading edge fixed structure 48 and an aft wall fixed structure 51 thereby providing a means to longitudinally translate the throat 35 relative to the wedge leading edge 18 and thereby vary and control the second distance 37 and third distance 38 in FIG. 1. The upper wedge expansion ramp 22 is rotatably connected to the aft wall 42 by an afterbody hinge 58 at the throat 35. A slider assembly 52 provides a means to rotatably connect and support the aft end of the aft wall 42 in axial sliding engagement with a second inlet cowl fixed structure 53. The slider assembly 52 is illustrated as having at least one inlet cowl fixed slot 54 in the second inlet cowl fixed structure 53 and a cylindrical pin 56 attached to the aft end of the aft wall 42 and inserted in the slot. The support provided by the slider assembly 52 allows the aft wall 42 to be translated longitudinally while maintaining an expansion angle as a function of the position of the wedge leading edge 18 and the throat 35. A boundary layer bleed plenum 46 is provided beneath the aft wall 42 within the wedge 12 to effectively bleed off boundary layer air from the surface of the upper compression ramp 20. Note that in accordance with the preferred embodiment of the invention only one plenum 46 is provided for the upper compression ramp 20 and because of the symmetry of the present embodiment only one similar plenum (not shown) is provided for the lower compression ramp 21.

Figure 3A:
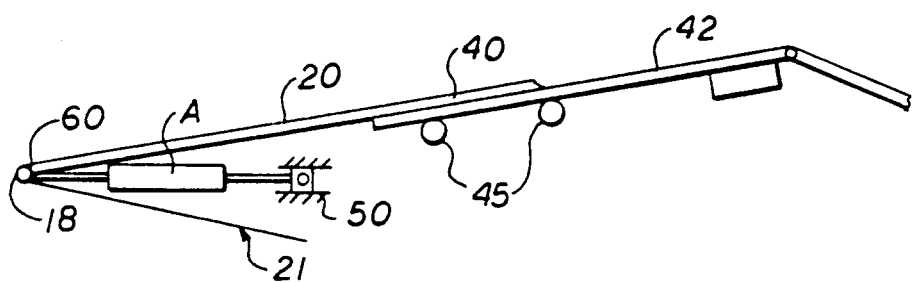
FIGS. 3A-3C are schematic cross-sectional views through three different planes of a telescoping center wedge illustrated in FIG. 1 in accordance with a second embodiment of the present invention.
Figure 3B:
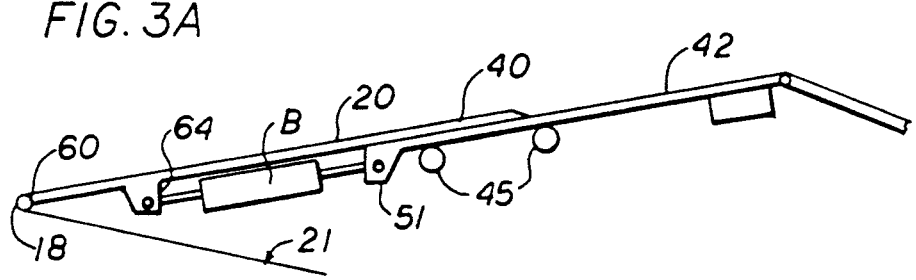

The embodiment of the present invention illustrated in FIG. 2 is for a fixed wedge angle 32. An alternative embodiment for a variable forwardmost wedge angle 32 is illustrated in FIGS. 3A-3B, each of which illustrates one or more longitudinally extending planes that are parallel to FIG. 1. FIG. 2 illustrates first and second linear actuating means A and B, respectively, as being the same plane. However, as illustrated in FIGS. 3A-3B, the present invention includes embodiments in which one, two or more linear actuating means may each be disposed in a different plane. For instance the first and second linear actuating means A and B may each be disposed in two separate planes if two linear actuating means are used.

Still referring to FIGS. 3A-3B, wedge 12 has a variable forwardmost wedge angle 32 provided in part by a leading edge hinge 60 rotatably connecting the forwardmost forward walls 40 of the upper and lower compression ramps 20 and 21 at the wedge leading edge 18. The first linear actuating means A is disposed between the leading edge hinge 60 and the first inlet cowl fixed structure 50 thereby providing a means to longitudinally translate the leading edge and thereby vary and control the first distance 36 in FIG. 1 in a manner similar to the embodiment illustrated in FIG. 1. The second linear actuating means B is disposed between the forward wall fixed structure 64 and the aft wall fixed structure 51 thereby providing a means to longitudinally translate the throat 35 relative to the wedge leading edge 18 and thereby vary and control the second distance 37 and third distance 38 in FIG. 1. Actuating means A and B can be used in combination such that the airflow capture and throat area variation are de-coupled. Note that the upper and lower wedge compression ramps 20 and 21 are rotatable with respect to each other and are symmetrical about centerplane 5. However, the second linear actuating means B may be operated at a different rate for the top and bottom compression ramps so that they may be operated asymmetrically if desired.

The forwardmost wedge angle 32 is varied and controlled by a third linear actuating means C which is operably disposed between the leading edge hinge 60 and a double drag linkage 62 operably connected to forward walls 40 of the upper wedge compression ramp 20 and the lower wedge compression ramp 21. The double drag linkage 62 has doubly pinned links 63 which when actuated by the third linear actuating means C either pulls the upper and lower wedge compression ramps 20 and 21 together or pushes them apart in a direction normal to the centerplane 5.

Figure 3C:
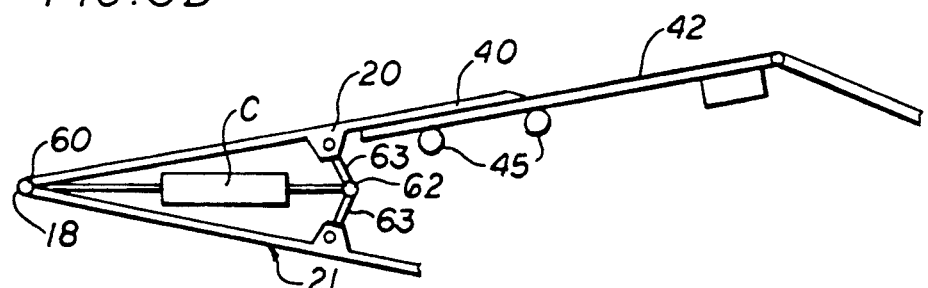

Another embodiment of the present invention, for providing multiple intermediate wedge angle compression ramp surfaces, is illustrated in FIGS. 4A and 4B. The wedge 12 is provided with at least one set of compression ramp hinges 66 at an intermediate position on the compression ramp for a variable intermediate ramp angle 67. The embodiments illustrated in FIGS. 4A and 4B show a fixed wedge angle 32 but the variable intermediate ramp angle 67 feature and multiples thereof may be used on the wedge 12 having the variable forwardmost wedge angle 32 as illustrated in FIGS. 3A-3C. Referring to FIG. 4A, the variable intermediate ramp angle 67 is varied and controlled by a fourth linear actuating means D which is operably disposed between a compression ramp fixed structure 68 located forward of the compression ramp hinges 66 and a second double drag linkage 70 operably connected to the upper and lower compression ramps 20 and 21 at a position aft of the compression ramp hinges 66. The second double drag linkage 70 has doubly pinned links 63 which when actuated by the fourth linear actuating means D rotates the portions of the forward walls 40 that are of the compression ramp hinges 66 so as to vary the intermediate ramp angle 67.

Referring to FIG. 4B, the aft wall 42 has a forward section 42F and an aft section 42A rotatably connected by an aft wall hinge 74 thereby forming a second variable intermediate ramp angle 76. The second intermediate ramp angle 76 is varied and controlled by a fifth linear actuating means E which is operably disposed between a first lever 78 cantilevered off the forward section 42F and a second lever 80 cantilevered off the aft section 42A. The first and second levers when actuated by the fifth linear actuating means E rotates aft section 42A about the aft end of the forward section 42F about the aft wall hinge 74 hinge so as to vary the intermediate ramp angle 76.

The breadth of the present invention as claimed herein encompasses the use of one or more intermediate ramp angles on the forwardmost wedge wall as well as those aft and on both fixed and variable forwardmost wedge angles at the leading edge of the wedge. Operation of the variable wedge and ramp angles may be combined with the upper rotatable cowl leading edge ramp 26 and the lower rotatable cowl leading edge ramp 27 (in FIG. 1) resulting in an inlet geometry which produces a balanced shockwave system at all supersonic flight Mach numbers and for which the cowl shockwave always impinges between the forebody 19 and the afterbody 19A of the telescoping center wedge 12 at the throat 35 of the diffuser 4. An important advantage of the impinging cowl shockwave always intersecting the center wedge throat, is simplification and increased efficiency of the center wedge boundary layer bleed system. This eliminates the need to proportionally enlarge the region of surface boundary layer bleed and in many cases to compartmentalize the boundary layer receiving plenums on the back side of the compression ramp to prevent boundary layer separation on the supersonic compression side of the ramp which results from recirculation.

While the preferred and an alternate embodiment of the present invention has been described fully in order to explain its principles, it is understood that various modifications or alterations may be made to the preferred embodiment without departing from the scope of the invention as set forth in the appended claims.

I claim:

1. A two-dimensional inlet for a jet aircraft engine comprising:
    an axially telescoping wedge having at least one upper and lower set of forward and aft walls in overlapping sliding engagement,
    said forward walls overlapping said aft walls forming an aft facing step,
    a forwardmost set of upper and lower walls disposed above and below a wedge centerplane at a forwardmost wedge angle to each other and forming a leading edge of said wedge at their forward edges,
    a means for axially translating said leading edge relative to a fixed element of said inlet and a means for changing a length of said wedge from said leading edge to a throat of said inlet.

2. A two-dimensional inlet as claimed in claim 1 further comprising a means to vary said forwardmost wedge angle.

3. A two-dimensional inlet as claimed in claim 1 further comprising:
    a two-dimensional cowl inlet having upper and lower cowl inlet leading edges disposed above and below said wedge respectively,
    said cowl inlet located a first distance upstream from said throat, and
    wherein said means for changing a length of said wedge from said leading edge to a throat of said inlet is operable to vary said first distance by axially translating said leading edge relative to said throat.

4. A two-dimensional inlet as claimed in claim 2 further comprising:
    a two-dimensional cowl inlet having upper and lower cowl inlet leading edges disposed above and below said wedge respectively,
    said cowl inlet located a first distance upstream from said throat, and
    wherein said means for changing a length of said wedge from said leading edge to a throat of said inlet is operable to vary said first distance by axially translating said leading edge relative to said throat.

5. A two-dimensional inlet as claimed in claim 1 further comprising a means to vary said inlet area.

6. A two-dimensional inlet as claimed in claim 3 further comprising a means to vary said inlet area.

7. A two-dimensional inlet as claimed in claim 6 wherein said means to vary said inlet area comprises upper and lower rotatable cowl leading edge ramps having said upper and lower cowl inlet leading edges on respective ones of their forward ends.

8. A two-dimensional inlet as claimed in claim 7 further comprising at least one intermediate compression ramp surface on at least one of said set of forward walls and said set of aft walls wherein said intermediate compression ramp surface is at an intermediate wedge angle to a centerplane between said upper and lower walls than a longitudinally adjacent forward ramp.

9. A two-dimensional inlet as claimed in claim 8 wherein said intermediate wedge angle is variable.

10. A two-dimensional inlet as claimed in claim 1 further comprising:
    a two-dimensional cowl inlet having upper and lower cowl inlet leading edges disposed above and below said wedge respectively,
    said cowl inlet located a first distance upstream from said throat,
    a first linear actuation means for axially translating said leading edge relative to a fixed element of said inlet, and
    a second linear actuation means for changing a length of said wedge from said leading edge to a throat of said inlet.

* * * * *